United States Patent
Ramey et al.

(10) Patent No.: US 6,298,128 B1
(45) Date of Patent: Oct. 2, 2001

(54) UNIFIED DIRECTORY FOR CALLER ID AND ELECTRONIC MAIL ADDRESSES

(75) Inventors: Blaine Edward Ramey; John Justin Caffrey; Mingheng Wang, all of Indianapolis, IN (US)

(73) Assignee: Thomson Licensing S.A., Boulogne (FR)

( * ) Notice: Subject to any disclaimer, the term of this patent is extended or adjusted under 35 U.S.C. 154(b) by 0 days.

(21) Appl. No.: 09/266,477

(22) Filed: Mar. 11, 1999

(51) Int. Cl.[7] ............................. H04M 1/56; H04M 15/06
(52) U.S. Cl. ................................ 379/142.01; 379/142.17; 379/142.06; 379/142.04; 379/142.15
(58) Field of Search ................................... 379/142, 127, 379/93.24, 100.08, 88.11, 88.12, 88.13, 88.15, 88.17, 88.16, 88.19, 88.2, 88.21, 88.22, 88.26, 93.23, 93.17, 100.01, 142.01, 142.17, 142.06, 142.15

(56) References Cited

U.S. PATENT DOCUMENTS

| | | | |
|---|---|---|---|
| 4,612,416 | 9/1986 | Emerson et al. | 179/6.11 |
| 4,837,798 | 6/1989 | Cohen et al. | 379/88 |
| 4,932,022 | 6/1990 | Kenney et al. | 370/60 |
| 5,239,577 | 8/1993 | Bates et al. | 379/201 |
| 5,557,659 | 9/1996 | Hyde-Thomson | 379/88 |
| 5,647,002 | 7/1997 | Brunson | 380/49 |
| 5,657,378 | 8/1997 | Haddock et al. | 379/93.23 |
| 5,671,269 | 9/1997 | Egan et al. | 379/88 |
| 5,692,038 | 11/1997 | Kraus et al. | 379/210 |
| 5,727,053 | 3/1998 | Sizer, II et al. | 379/142 |
| 5,754,636 | * 5/1998 | Bayless | 379/142 |
| 5,867,567 | 2/1999 | Itho | 379/142 |
| 5,930,350 | * 7/1999 | Johnson | 379/355 |
| 5,991,382 | * 11/1999 | Bayless | 379/142 |
| 6,005,928 | * 7/1999 | Johnson | 379/142 |
| 6,026,158 | * 2/2000 | Bayless | 379/142 |
| 6,047,054 | * 4/2000 | Bayless | 379/142 |
| 6,192,118 | * 2/2001 | Bqyless | 379/142 |

FOREIGN PATENT DOCUMENTS

WO98/23058   5/1998   (WO).

OTHER PUBLICATIONS

IBM Technical Disclosure Bulletin, vol. 37, No. 9—Sep. 1994, "Workstation Communications Bulletin", pp. 101–104.

PCT search report citing AM and AR.

\* cited by examiner

*Primary Examiner*—Curtis Kuntz
*Assistant Examiner*—Rexford N Barnie
(74) *Attorney, Agent, or Firm*—Joseph S. Tripoli; Frank Y. Liao

(57) ABSTRACT

A method and system for message communications in different media. A first message is received via a first communications medium. First address information associated with the first communications medium is extracting from the first communications medium. Second address information associated with a second communications medium is determined automatically in response to the first address information. A reply for the first message is sent via the second communications medium using the second address information.

20 Claims, 4 Drawing Sheets

| ENTRY | CALLER ID | | ... | E-MAIL | | ... | EXTENSIONS | | ... |
|---|---|---|---|---|---|---|---|---|---|
| | NUMBER | NAME | | ADDRESS | REAL NAME | | FAX NUMBER | POSTAL ADDRESS | |
| 1 | 555-4321 | John Ray | | | | | | | |
| 2 | 555-1234 | Bill Bey | | BBey @ iil.com | Bill Bey | | | | |
| 3 | | | | JRay @ ab.com | John Ray | | | | |
| 4 | 555-4231 | Tom Hays | | THays @ lli.com | Tom Hays | | | | |
| 5 | 5551324 | Hank Day | | | | | | | |
| 6 | | | | CTrei @ lil.com | Charlie Trei | | | | |

| ENTRY | CALLER ID | | ... | E-MAIL | | ... | EXTENSIONS | | ... |
|---|---|---|---|---|---|---|---|---|---|
| | NUMBER | NAME | | ADDRESS | REAL NAME | | FAX NUMBER | POSTAL ADDRESS | |
| 1 | 555-4321 | John Ray | | | | | | | |
| 2 | 555-1234 | Bill Bey | | BBey @ iii.com | Bill Bey | | | | |
| 3 | | | | JRay @ ab.com | John Ray | | | | |
| 4 | 555-4231 | Tom Hays | | THays @ lii.com | Tom Hays | | | | |
| 5 | 5551324 | Hank Day | | | | | | | |
| 6 | | | | CTrei @ iii.com | Charlie Trei | | | | |

Fig. 2

UNIFIED DIRECTORY FOR CALLER ID AND ELECTRONIC MAIL ADDRESSES

The present invention relates to a communication device able to communicate in more than one communications medium, and in particular to a communication device with interaction between the communications media.

One such communications medium is telephone. Telephone instruments with caller ID capabilities have been in use for some time. When such instruments receive a telephone call, they also receive the telephone number of the calling telephone and the name of the person owning the calling telephone. The telephone number and/or name may be displayed when the telephone call is received. The subscriber can then know the person making the call, and prepare for the conversation or not answer the call at all.

The caller ID capabilities are often combined with answering machine capabilities, a combination termed voice mail. Should the intended recipient be unable to receive a telephone call, the caller records a message, which may be retrieved later by the subscriber. The caller ID information is associated with the recorded message, and also stored. Should the subscriber wish to return the telephone call, the associated caller ID information is retrieved and allows the call to be automatically placed to the originating telephone number.

Another such communications medium is electronic mail (e-mail). Electronic mail communications devices have also been in use for some time. Such devices are coupled to a communications network, and have the capability of receiving e-mail messages from others also connected to that communications network. In its most basic form, e-mail messages are textual in nature, and are generally typed at a alphanumeric keyboard by the originator. The recipient can read the message on an alphanumeric display. Extensions to the basic e-mail system permit inclusion of, for example, sound files, image files, or other data files which may be seen in-line or processed as separate attachments. The message is packaged in an electronic envelope, which is sent, via the communications network, to the recipient. The envelope includes, among other things, the e-mail address of the recipient, the e-mail address of the originator, and the e-mail name of the originator.

In general, e-mail messages for a subscriber are stored in a system coupled to the communications network termed a mail box or mail server. When the subscriber wishes, the mail box is accessed from the e-mail device and the accumulated e-mail messages forwarded to the recipient and read. The information from the envelope, including the originating e-mail address and e-mail name, is retrieved along with the message. Should the recipient wish to reply to the e-mail message, the retrieved recipient e-mail address from the envelope allows the return e-mail to be addressed automatically.

Systems for accessing messages in various communications media in an integrated manner have also been described in the art. U.S. Pat. No. 4,612,416, issued Sep. 16, 1986 to Emerson et al., illustrates a PBX system including different communications functions for corresponding communications media (i.e. voice mail, e-mail, facsimile, etc.). When a subscriber checks any message function, all can be checked, and the user switched transparently to which ever function contains a message to be retrieved.

U.S. Pat. No. 4,837,798, issued Jun. 6, 1989 to Cohen et al., illustrates a communications system including a centralized, unified repository for received messages in any communications medium, including voice mail, e-mail, and any other media such as facsimile. The central location receives notification of each message received, and then notifies the recipient of the receipt of the message. The centralized repository also performs conversion of the message from one medium to another (for example, from e-mail to voice mail via text-to-voice generation) to the extent possible to permit the recipient to retrieve all messages in whatever medium desired.

U.S. Pat. No. 5,239,577 issued Aug. 24, 1993 to Bates et al. illustrates a telephone system in which all telephone numbers (for example, home, home fax, business, business fax, mobile, etc.) for an individual are accessible through a publically available, centrally located, directory of directories for that individual. A call intended for one of the telephone numbers may be completed by specifying another telephone number (e.g. home telephone), and requesting the desired other number (e.g. business telephone). The desired telephone number is found by consulting the centrally located directory of directories, and then the directory containing that individual's business telephone number.

U.S. Pat. No. 5,557,659, issued Sep. 17, 1996 to Hyde-Thomson, illustrates a system in which the e-mail communications medium is used for both e-mail and voice mail. Voice mail messages are converted to sound files and attached to e-mail messages which are, in turn, sent to the e-mail device of the subscriber.

U.S. Pat. No. 5,647,002, issued Jul. 8, 1997 to Brunson, illustrates a system in which each different communication medium (i.e. voice mail, e-mail, facsimile, etc.) has it's own message reception center (i.e. mail box), in the usual manner. Each message is duplicated when it is received, to the extent possible, and sent to the reception centers of each of the other communications media. Each reception center is coupled to a synchronizer which maintains all of the mail boxes in synchronism.

U.S. Pat. No. 5,671,269, issued Sep. 23, 1997 to Egan et al., illustrates a personal computer based telephone system in which a telephone number, derived in any of a number of different ways, is associated with each incoming telephone call, and if a return phone call is desired, the associated telephone number is used to place the return call.

U.S. Pat. No. 5,692,038, issued Nov. 25, 1997 to Kraus et al. illustrates a centrally controlled communications system involving several communications media in which a personal identification number is assigned to an individual, and each telephone number (or other identification such as e-mail address) associated with that individual is searched in an order set by the individual when that individual receives a message.

In addition, software products available at this time maintain a unified mail box for messages from different communications media. For example, Microsoft Outlook e-mail client maintains a single mail box containing both e-mail and facsimile messages.

It may, however, be desirable that a received voice mail message be replied to with an e-mail message, or vice versa. For example, a phone request for a document is best answered with an e-mail message to which the desired document is attached. Similarly, an e-mail message containing a document for which approval is sought may be best answered with a telephone call giving that approval. However, none of the above systems extract information associated with a message received in one communications medium and use that information to permit a user to reply to that message using a different communications medium.

In accordance with principles of the present invention, a method and system for messages communications in different media is disclosed. A first message is received via a first communications medium. First address information associated with the first communications medium is extracting from the first communications medium. Second address information associated with a second communications medium is determined automatically in response to the first address information. A reply for the first message is sent via the second communications medium using the second address information.

Also in accordance with principles of the present invention, a method for automatically providing a destination address for a reply in a first communications medium to a message received from an originating address and an originating name in a second communications medium comprises the following steps. A correspondent data base contains a plurality of entries, each entry representing a correspondent and containing an address field and a name field for messages in the first communications medium, and an address field and a name field for messages in the second communications medium. This data base is searched for a first entry containing the originating address in the address field for messages in the second communications medium. If the first entry contains an address in the address field for messages in the first communications medium, that address is provided as the destination address. If the first entry does not contain an address in the address field for messages in the first communications medium, the correspondent data base is searched for a second entry having a name in the name field for messages in the first communications medium corresponding to the originating name. If a second entry is found, the contents of the address field for messages in the first communications medium in the second entry is provided as the destination address and the first and second entries are merged. If a second entry is not found, an address is requested from a user. The first entry is updated by storing the user-supplied address in the address field for messages in the first communications medium and the originating name is saved in the name field for messages in the first communications medium. The user-supplied address is provided as the destination address.

A communications device according to the invention permits a user to easily reply to an incoming message in any communications medium by a reply message in whatever communications media is most convenient, regardless of which communications medium was used to send the incoming message.

In the drawing:

FIG. 2 is a table describing the structure and contents of a database used in the communications device illustrated in FIG. 1;

Figure 1:
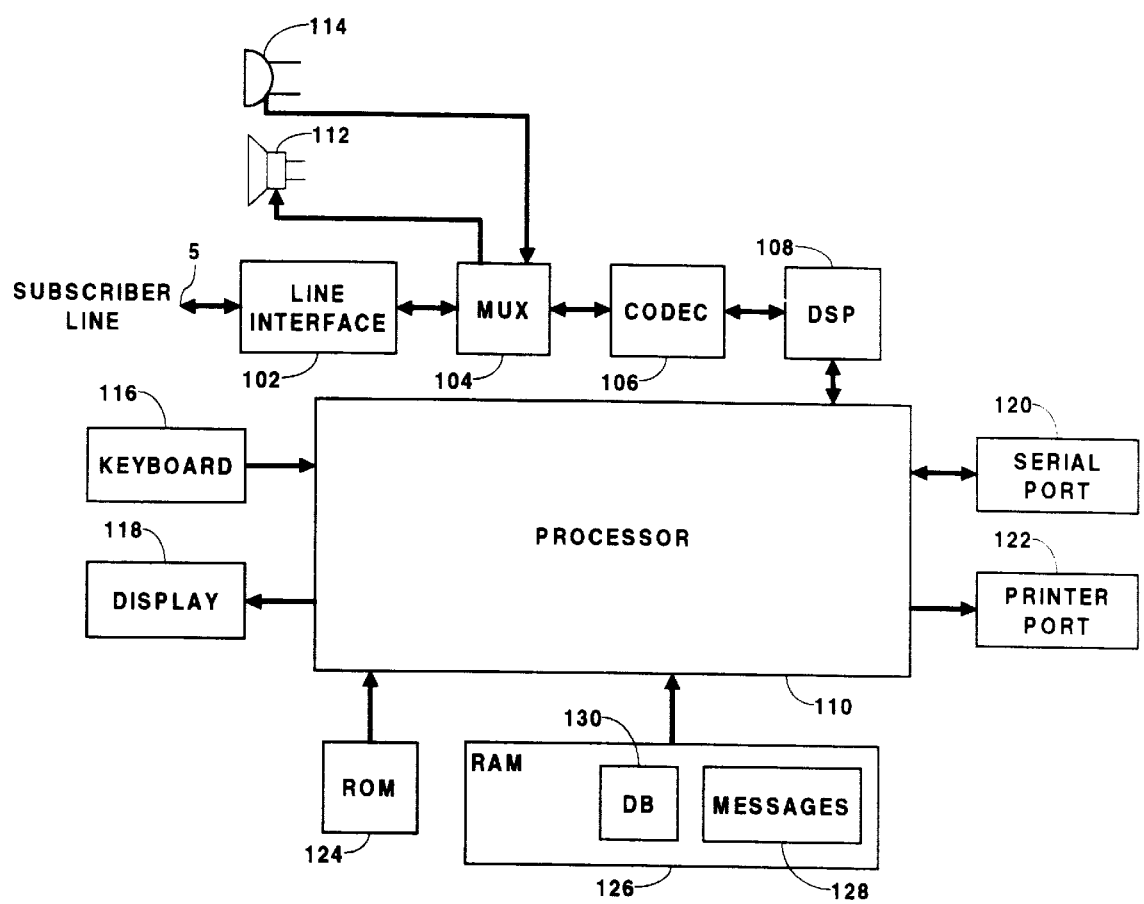
FIG. 1 is a block diagram of a communications device according to the present invention.

FIG. 1 is a block diagram of a communications device 10 according to the present invention. In FIG. 1, a subscriber telephone line is coupled to an bi-directional terminal 5. Terminal 5 may, for example, be an easy-connect RJ11 type connector. Terminal 5 is bidirectionally coupled to a processor 110 through a serial connection of a line interface circuit 102, a multiplexer (MUX) 104, a coder/decoder (codec) 106 and a digital signal processor (DSP) 108. An output terminal of the multiplexer 104 is coupled to an input terminal of a speaker 112 and an output terminal of a microphone 114 is coupled to an input terminal of the multiplexer 104.

An output terminal of a keyboard 116 is coupled to an input terminal of the processor 110 and an output terminal of the processor 110 is coupled to an input terminal of a display device 118. A bi-directional terminal of the processor 110 is coupled to a serial port 120, and an output terminal of the processor 110 is coupled to an output port 122 to which a printer may be connected. An output terminal of a non-volatile read-only memory (ROM) 124 is coupled to an input terminal of the processor 110 and a bi-directional terminal of a read/write random access memory (RAM) 126 is coupled to a corresponding terminal of the processor 110.

In operation, the processor 110 controls the operation of the communications device 10. The processor reads and executes the stored program code in the ROM 124, accesses constants in the ROM 124 and reads and writes variable data from and to the RAM 126. Further the processor exchanges data with the various input/output (I/O) ports: the serial port 120, the printer port 122, the keyboard 116, the display device 118, and the telephone line port coupled to the DSP 108, all in a known manner. Images are displayed on the display device 118 to provide information to the user, and depression of the keys on the keyboard 116 are detected to accept information from the user. A least some of the keys in the keyboard 116 are physically adjacent to the display device 118. The image displayed on the display device can provides the labels for at least some of the buttons on the keyboard, thus providing dynamic functioning for those buttons, all in a known manner.

The communications device illustrated in FIG. 1 operates as both a telephone caller ID and answering machine, and an e-mail terminal. The subscriber line is used to couple the device 10 to the public telephone system. The public telephone system is used in the normal way in a telephone mode of operation, and connects the device 10 to an e-mail server or mailbox in an e-mail mode of operation.

In the telephone mode, an incoming telephone call from the subscriber line causes the device 10 to ring, either via a separate ringer (not shown) or using the speaker-phone speaker 112. At this time, caller ID information, including the telephone number of the originating telephone and the name associated with the originating telephone, is extracted from the incoming telephone call by the processor 110 via the codec 106 and DSP 108, and displayed in the display device 118, all in a known manner. The caller ID information is further inserted into a database of correspondent information 130, maintained in a portion 130 of the RAM 126 in a manner to be described in more detail below.

If the user does not answer the call after some predetermined number of rings (e.g. 4), the processor 110 retrieves from the ROM 124 or RAM 126 a digitized version of a message for the originator of the incoming telephone call, for example asking the originator to leave a message. The combination of the codec 106 and DSP 108 converts the digitized message into an audio message and supplies it to the originating telephone via the multiplexer 104. The originator, in turn, can choose to dictate a message for the user. That message is received by the device 10, and digitized via the combination of the codec 106 and DSP 108. The processor then stores the digitized message in a portion 128 of the RAM 126 allocated to storing such messages. The caller ID information associated with this message is also stored with the message. Other information about the incoming message, such as the date and time it was received, is also stored with the message in the message portion 128 of the RAM 126.

In the e-mail mode, the processor 110 accesses the e-mail server by dialing the telephone number of that server, in a known manner. E-mail messages for the user are retrieved, and stored in the RAM 126, also in the message portion 128. Each e-mail message includes identification information, including the e-mail address and e-mail name of the originator of the message. Other e-mail information relating to that message may also be included, such as the date and time the message was sent, the location from which it was sent, routing information, etc. The e-mail identification information is also stored with the message in the message portion 128 of the RAM 126. The e-mail information is also inserted into the database of correspondent information 130, maintained in a portion 130 of the RAM 126 in a manner to be described in more detail below.

When a message is received, the identification information relating to that message (e.g. originating telephone number and name for telephone messages and originating e-mail address and e-mail name for e-mail messages, and possibly other related information) is stored in a common database, as referred to above. In this manner the content of the database is maintained.

FIG. 2 is a table describing the structure and contents of a database used to contain correspondent information in the communications device illustrated in FIG. 1. The structure of the correspondent database is represented in FIG. 2 as a table.

Each row of the table represents an entry in the correspondent database and represents one correspondent. Each entry contains a plurality of fields able to hold information relating to the correspondent represented by that entry. The fields are partitioned into: a group of fields able to contain caller ID information including the telephone number, caller ID name, and other attributes (represented by an ellipsis) related to the telephone for that correspondent; a group of fields able to contain e-mail identification information including the e-mail address, e-mail name, and other attributes (represented by an ellipsis) related to e-mail of that correspondent; and a group of fields able to contain extensions to the correspondent information, including, for example, the facsimile telephone number, postal address and other such information (represented by an ellipsis).

When a telephone call is received, the caller ID telephone number and name is extracted from the originating message in a known manner, as described above. The originating telephone number is compared to the telephone numbers stored in the caller ID number field of all the entries in the database. If a match is found, then the caller ID name field of that entry is updated with the originating caller ID name, in case the name for that telephone number has changed. If this happens, one of the caller ID attributes, a status attribute, is changed to "new". For example, if the caller ID information for the originating telephone call is the number 555-4321 and the name is "John Ray", then this search finds entry 1. The database field containing the caller ID name is replaced with the name "John Ray".

If no entry is found which contains the originating message telephone number in the caller ID number field, then the originating caller ID name is compared with the names in the e-mail name field of all the entries in the database. In one embodiment, an exact match of the originating name is searched for. In another embodiment, recognizing that the e-mail and telephone caller ID names may not be exactly the same, a closest match is searched for. Such a search may be made by parsing both the originating message name and extracting last names and first name or first initial, then comparing them. Or a search may be made on like sounding names using the known Soundex system. If no match is found, then a new entry is created, and the caller ID number and name fields of that entry are filled with the caller ID number and name, respectively, of the originating telephone call. For example, if a telephone call is received with a number 555-6789 and a name of "Dave May", there is neither a match for the caller ID number nor the e-mail name for such a person. A new entry is created (for example, entry 7) and the caller ID number, 555-6789, is inserted into the caller ID number field of entry 7, and the caller ID name, Dave May, is inserted into the caller ID name field of entry 7.

If no entry is found which contains the originating message caller ID number in the caller ID number field, but an entry is found which contains date corresponding to the originating message caller ID name in the e-mail name field, then the caller ID number and name fields for that entry are checked. If there are entries in those fields, then this entry represents a different correspondent, but with a similar e-mail name. In this case, as well, a new entry is created, and the caller ID number and name from the originating telephone call are inserted, as described above. For example, if a telephone call is received with a number 555-6789 and a name of "Bill Bey Jr.", The search of the database finds entry 2, but this represents a different correspondent. A new entry is created (for example, entry 7) and the caller ID number, 555-6789, is inserted into the caller ID number field of entry 7, and the caller ID name, Bill Bey Jr., is inserted into the caller ID name field of entry 7.

If, however, the caller ID number and name fields of that entry are empty, then it is assumed that this entry represents the same correspondent as that of the originating telephone message. In one embodiment, the caller ID number and name of the originating telephone message are inserted into the caller ID number and name fields, respectively, of the entry. However, this assumption may not be correct. In one preferred embodiment, data from this entry is displayed on the display device 118, and the user allowed to indicate whether this entry represents the same correspondent via the keyboard 116. If not, then a new entry is made, as described above. In another preferred embodiment, a list of entries which have e-mail names close to the originating message caller ID name is displayed on the display device 118, and the user selects one of the listed entries, or none at all, using the keyboard. If an entry is selected, it is updated with the caller ID information, otherwise, a new entry is created.

For example, if a telephone call is received with a number 555-9786 and a name Charlie Trei, there is no match for the originating message caller ID number in any caller ID number field of any entry in the database. However, there is a match for the originating message caller ID name in the e-mail name field of entry 6. In this case the caller ID number and name fields are empty. The data related to this entry (and possible other similar entries) is displayed on the display device 118. If the user accepts this entry as representing the caller, then the caller ID number, 555-9786, is inserted into the caller ID number field of entry 6, and the caller ID name, Charlie Trei, is inserted into the caller ID name field of entry 6. If the user does not accept this entry as representing the caller, then a new entry (for example, entry 7) is created, as described above.

In a similar manner, when the communications device 10 receives an e-mail message, it parses the e-mail address and e-mail name from the message. The originating e-mail address is compared to the e-mail address fields of all the entries in the database. If an entry with a matching e-mail address is found, the e-mail name is updated to the e-mail name in the originating message. If no entry with a matching e-mail address is found in the database, the originating e-mail name is compared to the caller ID name fields in all the entries in the database. If a matching entry is found and the e-mail address and e-mail name fields of that entry are empty, the user is allowed to indicate whether the originating e-mail message comes from the same person as represented by that entry, as described above in more detail. If so, the e-mail address and e-mail name is inserted into the e-mail address and e-mail name fields, respectively, of the entry. Otherwise, a new entry is created with the e-mail address and e-mail name of the originating message, as described above.

Figure 3:
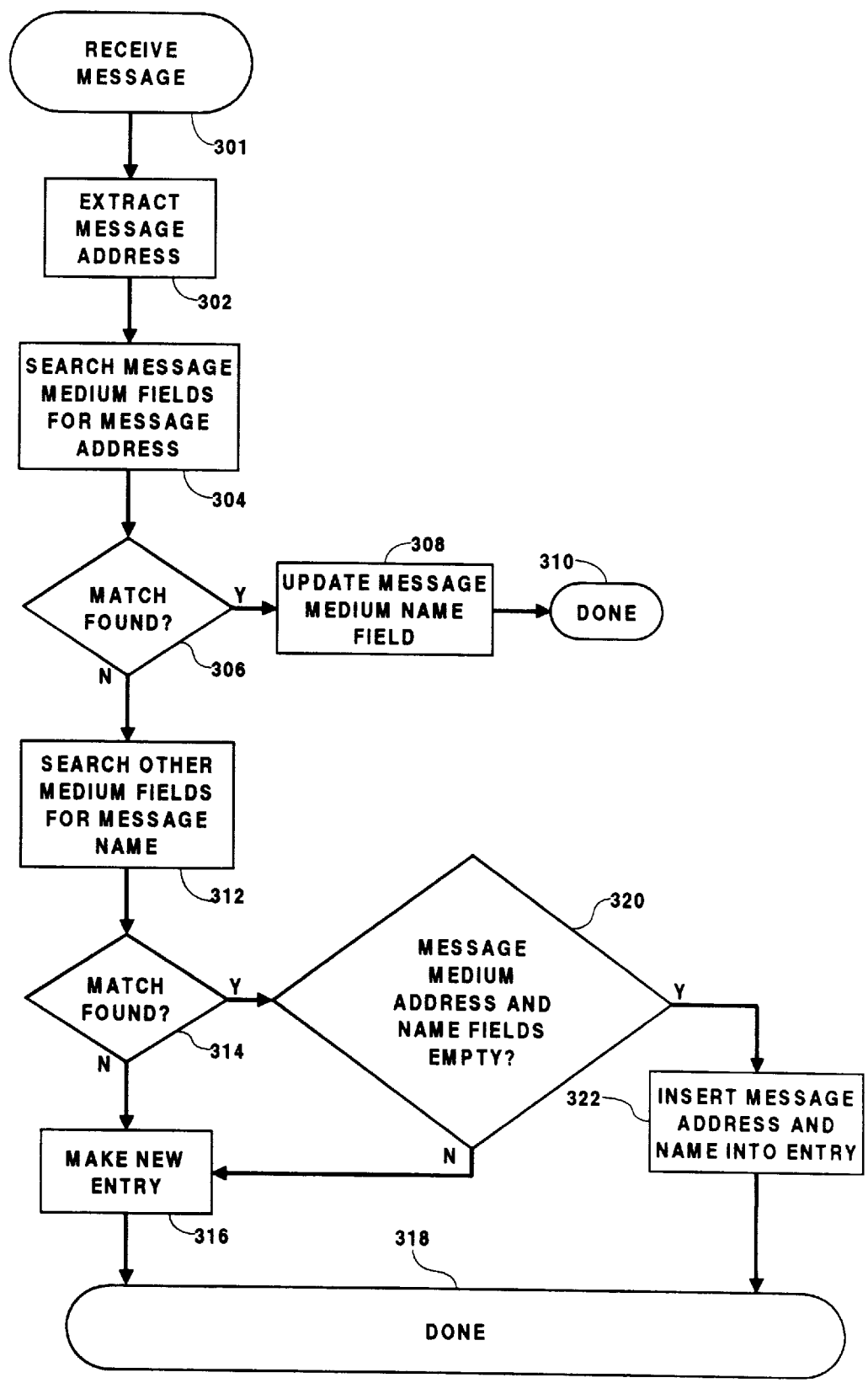
FIG. 3 is a flow diagram illustrating the method for inserting information into the database illustrated in FIG. 2.

As can be seen, FIG. 3, in general when a message is received (301) in either communications medium, the message address (i.e. caller ID number for telephone messages, and e-mail address for e-mail messages) is extracted from the message (302). The message address field is compared to the address field for the communications medium of the message (i.e., for telephone messages, the caller ID number is compared to the caller ID number field, and for e-mail messages, the e-mail address is compared to the e-mail address field) for all the entries in the database (304). If a matching entry is found (306), then the name field for the message communications medium is updated with the message name (i.e. caller ID name for telephone messages, e-mail name for e-mail messages). The database updating is then complete (310).

If a match is not found (306), the message name field is compared to the name field in the other communications medium (i.e. e-mail name for telephone messages, and caller ID name for e-mail messages) for all the entries in the database (312). If a matching entry is found (314), then the address and name fields for the message medium (i.e. caller ID number and name for telephone messages, and e-mail address and name for e-mail messages) are checked to determine if they are empty (320). If not, then a new entry is created with the message address and message name in the message medium address and name fields in the new entry (316). The database updating is then complete 318. If the message medium address and name fields are empty, then the message address and name are inserted into the message medium address and name fields, respectively (322), possibly with the approval of the user, and possibly with the user selecting one of a number of possible matching entries, all as described above. The database updating is then complete (318).

Referring again to FIG. 1, and the general operation of the communication device 10, the display screen 118 displays general information, such as the current date and time, the number of messages received, etc. The display screen also displays an integrated list of all messages which have been received, both telephone messages and e-mail messages, in a list window. Each entry in the list of messages shows the originator name—e.g. caller ID name for telephone messages and e-mail name for e-mail messages. Using the keyboard 116, the user is able to highlight entries in the message list. A detail window provides further information about the highlighted entry, such as whether it is a telephone or e-mail message, the caller ID name and number for telephone messages or e-mail address and e-mail name for e-mail messages, the date and time associated with the message, etc.

Using the keyboard 116, the user may perform several functions for each message. For example, the message may be retrieved. For telephone messages, the digitized voice message is retrieved from the message portion 128 of the RAM 126, converted to audio and played back through the speaker 112 by the codec 106 and DSP 108 under the control of the processor 110. For e-mail messages the textual body of the message is retrieved from the message portion 128 of the RAM 126, and displayed on the display device 118. For another example, the user may desire to reply to the message.

The user may reply to any message in either communications medium. That is, the reply to any message may be by either a telephone message or an e-mail message. When the user indicates, via the keyboard 116, that he wishes to reply to the message, a question is displayed on the display device 118 asking which communications medium is desired for the reply. The user supplies the answer to the question via the keyboard 116.

The user may specify that the reply be sent in the same communications medium as that of the received message, in which case, the destination address of the reply is the address in the originating message. I.e., for a telephone medium message the destination address is the caller ID number of the telephone message, and for an e-mail medium message the destination address is the originating e-mail address in the e-mail message. More specifically, to reply to a telephone message by placing a telephone call, the communications device 10 dials the telephone which sent the message using the stored caller ID telephone number. To reply to an e-mail message, a reply e-mail envelope is prepared using the e-mail address in the received e-mail.

However, the user may also specify that the reply be sent in the other communications medium. If a user wishes, for example, to reply to a telephone message by sending an e-mail message, the entry in the database containing the originating caller ID telephone number of the telephone message in the caller ID number field is found. Then the e-mail address field of that entry is checked. If there is an e-mail address in that field of that entry, an e-mail message header is Automatically composed using that e-mail address, and an e-mail composition screen is displayed on the display screen 118. The user can then type in the body of the e-mail message using the keyboard 116, and send the e-mail message when done.

For example, referring to FIG. 2, if the user wishes to reply by an e-mail to a telephone message from caller ID number 555-1234, the entry containing that telephone number in the caller ID number field is found (entry 2). The e-mail address field of entry 2 is then checked. In entry 2, the e-mail address field is not empty but contains an e-mail address (Bbey@iil.com). In response, an e-mail header containing the destination address of Bbey@iil.com is automatically prepared, the user types the message, then sends the e-mail message.

If there is no e-mail address in the e-mail address field of that entry, then the originating caller ID name is compared to the names in the e-mail name fields in all the entries in the database. As described above, an exact match may be searched for, a match of last and first names, or a match of like sounding names. The user may also be allowed to accept or reject the matching entry, or select one from a number of closely matching entries or none at all. If a matching entry is accepted, or one is selected by the user, then the e-mail address and name from the matching entry is merged with the caller ID number and name in the originating message entry to form a single entry. An e-mail message header is then automatically composed, and a message composed and sent by the user, as described above.

For example, if the user wishes to reply by an e-mail to a telephone message from caller ID number 555-4321, the entry containing that number is found (entry 1). The e-mail address field for entry 1 is empty. Thus, the caller ID name (John Ray) is compared to the names in the e-mail name field of the other entries. In this case an entry with a corresponding name, John Ray, is found (entry 3). The data in entry 3 is merged with the data in entry 1 to form a single entry with the combined information. That is, a single entry is formed having a caller ID number field containing 555-4321, a caller ID name field containing John Ray, an e-mail address field containing JRay@ab.com and an e-mail name field containing John Ray. This entry could be either entry 1 (deleting entry 3), entry 3 (deleting entry 1) or a new entry, e.g. entry 7 (deleting both entries 1 and 3). An e-mail header containing the destination address of JRay@ab.com is then automatically prepared, the user types the message, then sends the e-mail message.

If no matching entry is found, or none is selected by the user, then a message is displayed on the display screen 118 asking the user for the destination e-mail address for the reply to the telephone message. The user enters the destination e-mail address using the keyboard 116. The destination e-mail address entered by the user is inserted into the e-mail address field of the entry containing the caller ID information for the originating message, and the caller ID name is inserted into the e-mail name field of that entry. An e-mail message header is then automatically composed, and a message entered and sent by the user, as described above.

For example, if the user wishes to reply by an e-mail to a telephone message from caller ID number 555-1324, the entry containing that number is found (entry 5). The e-mail address for entry 5 is empty, and there is no other entry having data in the e-mail name field which the user finds matches the caller ID name Hank Day. In this case, an e-mail address for Hank Day is requested from the user, which the user supplies via the keyboard 116. The e-mail address, for example Hday@cba.com, is inserted into the e-mail address field of entry 5, and the caller ID name, Hank Day, is inserted into the e-mail name field of entry 5. An e-mail header containing the destination address of HDay@cba.com is then automatically prepared, the user types the message, then sends the e-mail message.

Similarly, if a user wishes to reply to a e-mail message by placing a telephone call, the entry in the database containing the originating e-mail address of the e-mail message is found. The caller ID number field of that entry is then checked. If there is a telephone number in that field of that entry then the telephone number is automatically dialed by the processor 110 via the DSP/08 and coder 106. If, however, there is no telephone number in the caller ID number field in that entry, then the originating e-mail name is compared to the caller ID name fields in all the entries in the database. As described above, this search may be for an exact match, a match of last and first names, or a match of like sounding names. In addition, the user may be given the opportunity to accept or reject the matching entry, or select one from a number of closer matching entries, or none at all. If a matching entry is found, or one is selected by the user, then the telephone number in the caller ID number field of the matching entry is automatically dialed by the processor 110 via the DSP 108 and codec 106. In addition, the caller ID number and name from the matching entry is merged with the e-mail number and name in the originating message entry to form a single entry. If no matching entry is found, or none is selected by the user, then the user may insert caller ID information by entering a destination telephone number. The destination telephone number entered by the user is inserted into the caller ID number field of the entry containing the originating e-mail message information, and the e-mail name is inserted into the caller ID name field of that entry. The user-entered telephone number is then automatically dialed, as described above.

Figure 4:
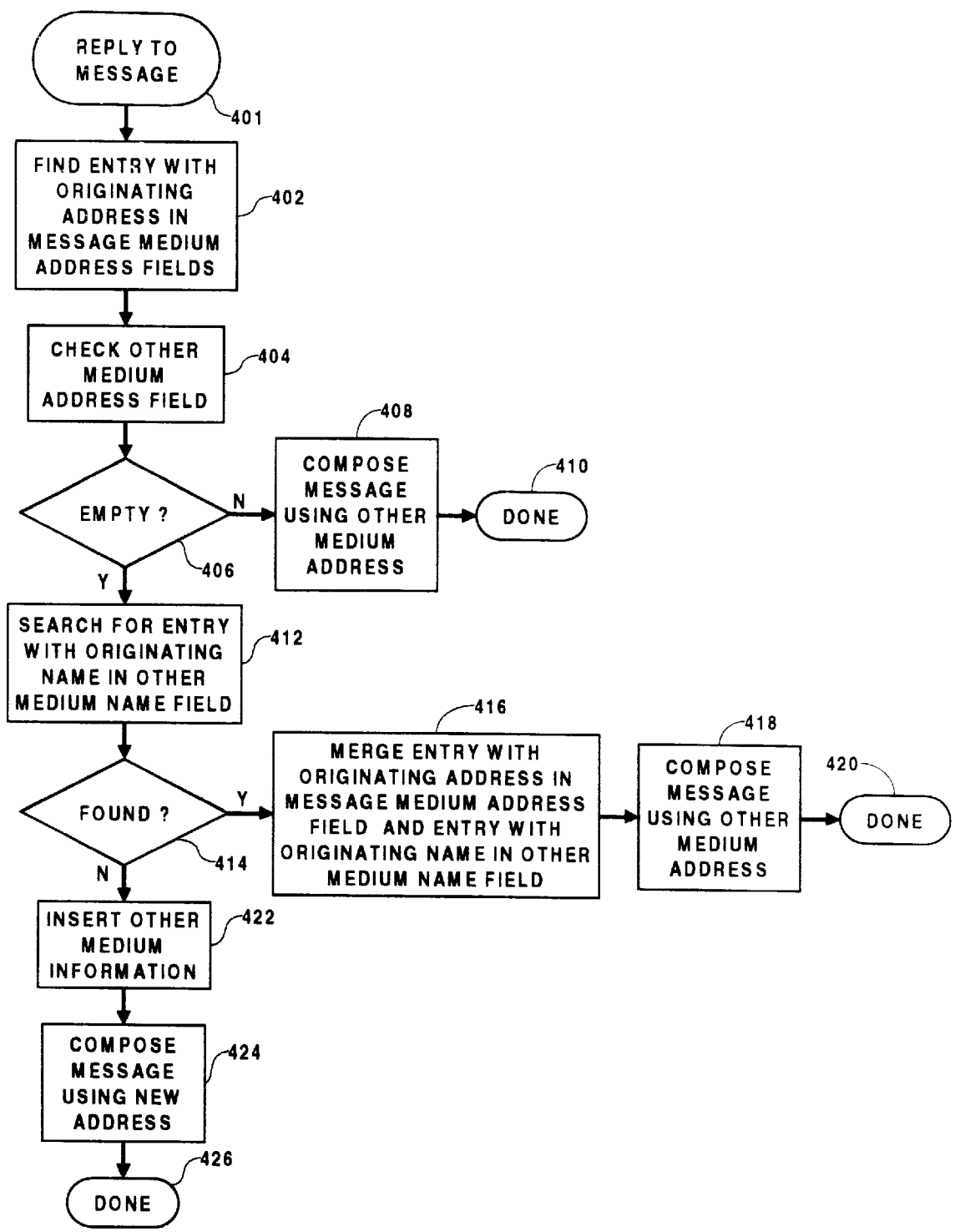
FIG. 4 is a flow diagram illustrating the method for supplying a reply address in one communications medium to a message received in the other communications medium.

As can be seen in FIG. 4, in general when a message is received in one medium and is to be replied to in the other communications medium (401), the entry in the database section 130 of the RAM 126 containing the originating address of the message in the fields relating to the communications medium of the received message is found (402). The address field relating to the other communications medium is checked (404). If that field is not empty (406), then a message in the other communications medium is composed and sent using the address in the address field relating to the other communications medium (408). The reply process then ends (410). If that field is empty (406), then the name contained in the originating message is compared to the name field related to the other communications medium in all the entries in the database (412).

If an entry is found (414), then a single entry in the database is formed by merging the information contained in the entry relating to the communications medium of the original message with the information contained in the matching entry relating to the other communications medium (416). Then a message in the other communications medium is composed and sent using the address in the address field relating to the other communications medium of the found entry (418).

If such an entry is not found, then a new record is created (422). The user is prompted for the destination address for the message in the other communications medium. The destination address is inserted into the address field for the other communications medium, and the name field for the message communications medium is inserted into the name field for the other communications medium (422). Then a message in the other communications medium is composed and sent using the address in the address field relating to the other communications medium of the found entry (424). The reply process then ends (426).

A communications device operating according to the present invention permits automatic replies in any communications medium to any received message.

What is claimed is:

1. Method for communicating messages, comprising the steps of:

receiving a first message via a first communications medium;

extracting from the first message first address information associated with the first communications medium;

determining in response to the first address information second address information associated with a second communications medium by searching a database comprising a plurality of entries, each of the entries having a respective address field and a name field associated with, respectively, the first communications medium, and also with the second communications medium, the database being searched first in a first entry of said entries and if not present searched in a second entry of said entries to locate an address in the address field for the first message in the first communications medium to provide second address information and if not found requesting an address from a user and saving the user-supplied address in one of the entries to provide said second address information.

2. The method of claim 1 further comprising the step of sending a reply for the first message via the second communications medium using the second address information.

3. The method of claim 1 further comprising the step of:
  searching for an entry in the database with a name in said second communications medium matching a name determined from said first message, if no entry is found having the same first address information.

4. A method for automatically providing a destination address for a reply in a first communications medium to a message received from an originating address and originating name in a second communications medium, comprising the steps of:
  searching a correspondent data base containing a plurality of entries, each entry representing a correspondent and containing an address field and a name field for messages in the first communications medium and an address field and a name field for messages in the second communications medium, for a first entry containing the originating address in the address field for messages in the second communications medium;
  if the first entry contains an address in the address field for messages in the first communications medium, providing that address as the destination address;
  if the first entry does not contain an address in the address field for messages in the first communications medium, searching the correspondent data base for a second entry having a name in the name field for messages in the first communications medium corresponding to the originating name;
  if a second entry is found, providing an address from the address field for messages in the first communications medium in the second entry as the destination address and merging the first and second entries;
  if a second entry is not found, requesting an address from a user, saving the user-supplied address in the address field for messages in the first communications medium in the first entry, saving the originating name in the name field for messages in the first communications medium in the first entry, and providing the user-supplied address as the destination address.

5. The method of claim 4 further comprising the step of maintaining the entries in the correspondent database in response to the received message in one of the first and second communications media.

6. The method of claim 5 wherein the maintaining step comprises the steps of:
  extracting the originating address of the message from the message;
  searching the correspondent database for a third entry containing the originating address in the address field for messages in the one of the first and second communications media;
    if a third entry is found, then inserting the originating name into the name field for messages in the one of the first and second communications media;
    if a third entry is not found, then searching the correspondent database for a fourth entry containing a name in the name field for messages in the other one of the first and second communications media corresponding to the originating name;
      if a fourth entry is found, then if the address field for messages in the other one of the first and second communications media and the name field for messages in the other one of the first and second communications media in the fourth entry are blank, then inserting the originating address into the address field for messages in the other one of the first and second communications media in the fourth entry and inserting the originating name into the name field for messages in the other one of the first and second communications media in the fourth entry;
      otherwise, adding a new entry to the correspondent database and inserting the originating address into the address field for messages in the one of the first and second communications media in the new entry and inserting the originating name in the name field for messages in the one of the first and second communications media in the new entry.

7. The method of claim 6 wherein the step of searching the correspondent data base for a fourth entry comprises the step of:
  searching for a plurality of close matches between the originating name and the name in the name field for messages in the other one of the first and second communications media;
  displaying the list of entries; and
  allowing the user to select one of the list of entries as the fourth entry.

8. The method of claim 6 wherein the step of searching the correspondent data base for a fourth entry comprises the step of searching for an exact match between the originating name and the name in the name field for messages in the other one of the first and second communications media.

9. The method of claim 6 wherein the step of searching the correspondent data base for a fourth entry comprises the step of searching for a closest match between the originating name and the name in the name field for messages in the other one of the first and second communications media.

10. The method of claim 4 wherein the step of searching the correspondent data base for a second entry comprises the step of:
  searching for a plurality of close matches between the originating name and the name in the name field for messages in the first communications medium;
  displaying the list of entries; and
  allowing the user to select one of the list of entries as the second entry.

11. The method of claim 4 wherein the step of searching the correspondent data base for a second entry comprises the step of searching for an exact match between the originating name and the name in the name field for messages in the first communications medium.

12. The method of claim 4 wherein the step of searching the correspondent data base for a second entry comprises the step of searching for a closest match between the originating name and the name in the name field for messages in the first communications medium.

13. The method of claim 4 wherein:
  one of the first and second communications media is e-mail, the address for e-mail messages is the e-mail address, and the name for e-mail messages is the name of the e-mail correspondent; and
  the other one of the first and second communications media is telephone, the address for telephone messages is the caller ID telephone number and the name for telephone messages is the caller ID name of the telephone correspondent.

14. Apparatus for automatically providing a destination address for a reply in a first communications medium to a message received from an originating address and originating name in a second communications medium, comprising:
  a database memory storing a correspondent data base containing a plurality of entries, each entry representing a correspondent and containing an address field and a name field for messages in the first communications medium and an address field and a name field for messages in the second communications medium;

a user input device;

a display device; and a processor, coupled to the database memory, the user input device and the display device, and responsive to instructions stored in a control program memory for:

conditioning the database memory to retrieve entries searching for a first entry containing the originating address in the address field for messages in the second communications medium;

if the first entry contains an address in the address field for messages in the first communications medium, then providing that address as the destination address;

if the first entry does not contain an address in the address field for messages in the first communications medium, then conditioning the database memory to retrieve entries searching for a second entry having a name in the name field for messages in the first communications medium corresponding to the originating name;

if a second entry is found, providing an address from the address field for messages in the first communications medium in the second entry as the destination address, merging the first and second entries, and conditioning the database memory store the merged entry in the database memory; and if a second entry is not found, conditioning the display device to display a request for a destination address, conditioning the user input device to receive a destination address from the user, conditioning the database memory to store the user-supplied destination address in the address field for messages in the first communications medium in the first entry and to store the originating name in the name field for messages in the first communications medium in the first entry, and providing the user-supplied address as the destination address.

15. The apparatus of claim 14, further comprising:

an input terminal, coupled to the processor, and able to receive messages in the first and second communications media; and a message memory, coupled to the processor; and wherein:

the processor is further responsive to the instructions for:

conditioning the message memory to store messages received from the input terminal in the message memory; and conditioning the database memory to maintain the entries in the database memory in response to the received message.

16. The apparatus of claim 15 wherein the processor is further responsive to the instructions for:

conditioning the message memory to extract the originating address of the received message;

conditioning the database memory to retrieve entries searching for a third entry containing the originating address in the address field for messages in the one of the first and second communications media;

if a third entry is found, then conditioning the database memory to insert the originating name into the name field for messages in the one of the first and second communications media of the third entry;

if a third entry is not found, then conditioning the database memory to retrieve entries searching the database memory for a fourth entry containing a name in the name field for messages in the other one of the first and second communications media corresponding to the originating name;

if a fourth entry is found, and if the address field for messages in the other one of the first and second communications media and the name field for messages in the other one of the first and second communications media in the fourth entry are blank, then conditioning the database memory to insert the originating address into the address field for messages in the other one of the first and second communications media in the fourth entry and to insert the originating name into the name field for messages in the other one of the first and second communications media in the fourth entry;

otherwise, conditioning the database memory to add a new entry, to insert the originating address into the address field for messages in the one of the first and second communications media in the new entry and to insert the originating name in the name field for messages in the one of the first and second communications media in the new entry.

17. The apparatus of claim 16 wherein the processor is further responsive to the instructions for conditioning the database memory to retrieve entries searching for a fourth entry by:

searching for a plurality of close matches between the originating name and the name in the name field for messages in the other one of the first and second communications media;

conditioning the display device to display the list of entries; and conditioning the user input device to receive user input allowing the user to select one of the list of entries as the fourth entry.

18. The apparatus of claim 14 wherein the processor is further responsive to the instructions for conditioning the database memory to retrieve entries searching for a second entry by:

searching for a plurality of close matches between the originating name and the name in the name field for messages in the first communications medium;

conditioning the display device to display the list of entries; and conditioning the user input device to allow the user to select one of the list of entries as the second entry.

19. The apparatus of claim 14 wherein the processor is further responsive to the instructions for conditioning the database memory to retrieve entries searching for a second entry by searching for an exact match between the originating name and the name in the name field for messages in the first communications medium.

20. The apparatus of claim 14 wherein the processor is further responsive to the instructions for conditioning the database memory to retrieve entries searching for a second entry by searching for a closest match between the originating name and the name in the name field for messages in the first communications medium.

* * * * *